US012679470B2

(12) United States Patent　　　　(10) Patent No.:　US 12,679,470 B2
Maeda　　　　　　　　　　　　　　　　(45) Date of Patent:　　　Jul. 14, 2026

(54) VEHICLE LOWER BODY STRUCTURE

(71) Applicant: TOYOTA JIDOSHA KABUSHIKI KAISHA, Toyota (JP)

(72) Inventor: Kazuhisa Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 335 days.

(21) Appl. No.: 18/528,791

(22) Filed: Dec. 5, 2023

(65) Prior Publication Data

US 2024/0253707 A1　　Aug. 1, 2024

(30) Foreign Application Priority Data

Jan. 31, 2023　(JP) ................................. 2023-013597

(51) Int. Cl.
　　*B62D 25/14*　　　(2006.01)
　　*B62D 25/20*　　　(2006.01)
　　*B62D 27/02*　　　(2006.01)
(52) U.S. Cl.
　　CPC ......... *B62D 25/14* (2013.01); *B62D 25/2018*
　　　　　　(2013.01); *B62D 27/02* (2013.01)
(58) Field of Classification Search
　　None
　　See application file for complete search history.

(56) References Cited

U.S. PATENT DOCUMENTS 6,817,657 B2 * 11/2004 Watanabe ............ B62D 25/081
　　　　　　　　　　　　　　　　296/203.02
7,059,667 B2 * 6/2006 Tomita ................. B62D 25/082
　　　　　　　　　　　　　　　　296/203.03

7,997,366 B2 * 8/2011 Tanaka ................... B62D 21/15
　　　　　　　　　　　　　　　　180/232
8,585,134 B2 * 11/2013 Yasui ................... B62D 21/152
　　　　　　　　　　　　　　　　296/204
9,873,460 B2 * 1/2018 Tatsuwaki .......... B62D 25/2036
11,027,685 B2 * 6/2021 Izutsu ..................... B60R 21/02
2016/0052554 A1 2/2016 Ozawa
2023/0339546 A1 10/2023 Park

FOREIGN PATENT DOCUMENTS

DE　　102022125842 A1　10/2023
EP　　　　　3106373 A1　12/2016
JP　　　　2003-118648 A　　4/2003
JP　　　　2006 111076　　*　4/2006
JP　　　　2006-193086 A　　7/2006
JP　　　　2009-096341 A　　5/2009

* cited by examiner

*Primary Examiner* — Joseph D. Pape
(74) *Attorney, Agent, or Firm* — SOLARIS Intellectual Property Group, PLLC

(57)　　　　　　ABSTRACT

A vehicle lower body structure includes: a left and right pair of rockers provided on respective sides, in a vehicle width direction, of a vehicle lower body and extending in a vehicle front-rear direction; a left and right pair of front side members provided at a front side, in a vehicle front-rear direction, of the rockers and extending in the vehicle front-rear direction; a cross member extending in the vehicle width direction, interconnecting front end portions of the left and right pair of rockers, and interconnecting rear end portions of the left and right pair of front side members; and a dash panel disposed on a rear side, in the vehicle front-rear direction, of the cross member, mechanically fastened to the cross member via fasteners, and partitioning a vehicle cabin interior from a vehicle cabin exterior.

7 Claims, 9 Drawing Sheets

VEHICLE LOWER BODY STRUCTURE

CROSS-REFERENCE TO RELATED APPLICATION

This application claims priority under 35 USC 119 from Japanese Patent Application No. 2023-13597, filed on Jan. 31, 2023, the disclosure of which is incorporated by reference herein in its entirety.

BACKGROUND

Technical Field

The present disclosure relates to a vehicle lower body structure.

Related Art

Japanese Patent Application Laid-open (JP-A) No. 2006-193086 discloses a structure in which a floor panel is bonded to a lower portion of a dash panel that partitions an engine bay from a cabin of a vehicle. Furthermore, in the structure of the above publication, a dash cross member is bonded to a front surface of the dash panel.

SUMMARY

Introducing structures for circular economies instead of current economic systems is being considered.

However, in a structure in which the dash panel and the dash cross member are welded to each other as in the structure disclosed in JP-A No. 2006-193086, it is difficult to continue to re-use part of the vehicle because the dash panel and the dash cross member cannot be separated.

The present disclosure obtains a vehicle lower body structure in which a dash panel can be easily separated from a dash cross member.

A vehicle lower body structure of a first aspect of the disclosure includes: a left and right pair of rockers that are provided on respective sides, in a vehicle width direction, of a vehicle lower body and that extend in a vehicle front-rear direction; a left and right pair of front side members that are provided on a front side, in the vehicle front-rear direction, of the rockers and that extend in the vehicle front-rear direction; a cross member that extends in the vehicle width direction, that interconnects front end portions of the left and right pair of rockers, and that interconnects rear end portions of the left and right pair of front side members; and a dash panel that is disposed on a rear side, in the vehicle front-rear direction, of the cross member, that is mechanically fastened to the cross member via fasteners, and that partitions a vehicle cabin interior from a vehicle cabin exterior.

In the vehicle lower body structure of the first aspect, a pair of rockers are provided on respective sides, in the vehicle width direction, of the vehicle lower body, and the rockers extend in the vehicle front-rear direction. Furthermore, a left and right pair of front side members are provided on the front side of the rockers, and the front side members extend in the vehicle front-rear direction. The cross member that extends in the vehicle width direction interconnects the front end portions of the rockers and interconnects the rear end portions of the front side members. Furthermore, a dash panel is disposed on the rear side of the cross member, and the dash panel partitions the vehicle cabin interior from the vehicle cabin exterior. Moreover, the dash panel is mechanically fastened to the cross member via fasteners. Because of this, the dash panel can be easily separated from the cross member by just unfastening the fasteners.

Furthermore, it is not necessary to provide dedicated parts or the like between the cross member and the dash panel, so an increase in weight of the vehicle lower body structure can be inhibited.

A vehicle lower body structure of a second aspect of the disclosure is the first aspect, wherein the cross member has a closed cross-sectional structure as viewed from the vehicle width direction.

In the vehicle lower body structure of the second aspect, the cross member is configured to have a closed cross-sectional structure, so when the dash panel has been separated from the cross member, a vehicle frame with the closed cross-sectional structure can be re-used.

A vehicle lower body structure of a third aspect of the disclosure is the second aspect, wherein the cross member includes a dash upper cross member positioned on an upper side and a dash lower cross member positioned on a lower side in a vehicle vertical direction, each of the dash upper cross member and the dash lower cross member has a closed cross-sectional structure, and the dash panel is fastened at a position between the dash upper cross member and the dash lower cross member.

In the vehicle lower body structure of the third aspect, the rigidity of the vehicle can be ensured by the dash upper cross member and the dash lower cross member that are each has a closed cross-sectional structure. Furthermore, by setting a fastening location of the dash panel at a position between the dash upper cross member and the dash lower cross member, vibrations and the like input to the fastening location can be absorbed by the dash upper cross member and the dash lower cross member, and the fastened state between the dash panel and the cross member can be well maintained.

A vehicle lower body structure of a fourth aspect of the disclosure is the third aspect, wherein sound insulating members are provided between the cross member and the dash panel.

In the vehicle lower body structure of the fourth aspect, sound produced by contact between the dash panel and the cross member can be inhibited by the sound insulating members. Furthermore, at least some vibration input to the fastening locations can be absorbed by the sound insulating members.

A vehicle lower body structure of a fifth aspect of the disclosure is the first aspect, wherein the cross member includes open cross-sectional portions that are open in the vehicle rearward direction as viewed from the vehicle width direction, the dash panel includes open cross-sectional portions that are open in the vehicle forward direction as viewed from the vehicle width direction, and closed cross-sections are configured in a state in which the cross member and the dash panel are fastened to each other.

In the vehicle lower body structure of the fifth aspect, the cross member is configured to have an open cross-section, and closed cross-sections are configured in a state in which the dash panel is fastened to the cross member, so the number of parts can be reduced while maintaining strength.

A vehicle lower body structure of a sixth aspect of the disclosure is any of the first aspect to the fifth aspect, wherein a lower end portion of the dash panel is joined to a floor panel configuring a floor inside the vehicle cabin.

In the vehicle lower body structure of the sixth aspect, the floor panel and the dash panel are joined to each other, so the floor panel and the dash panel can be integrally separated from the cross member by unfastening the fasteners.

As described above, according to the vehicle lower body structure pertaining to the present disclosure, there is obtained a vehicle lower body structure in which the dash panel can be easily separated from the cross member while inhibiting an increase in weight.

DETAILED DESCRIPTION

First Embodiment

Figure 1:
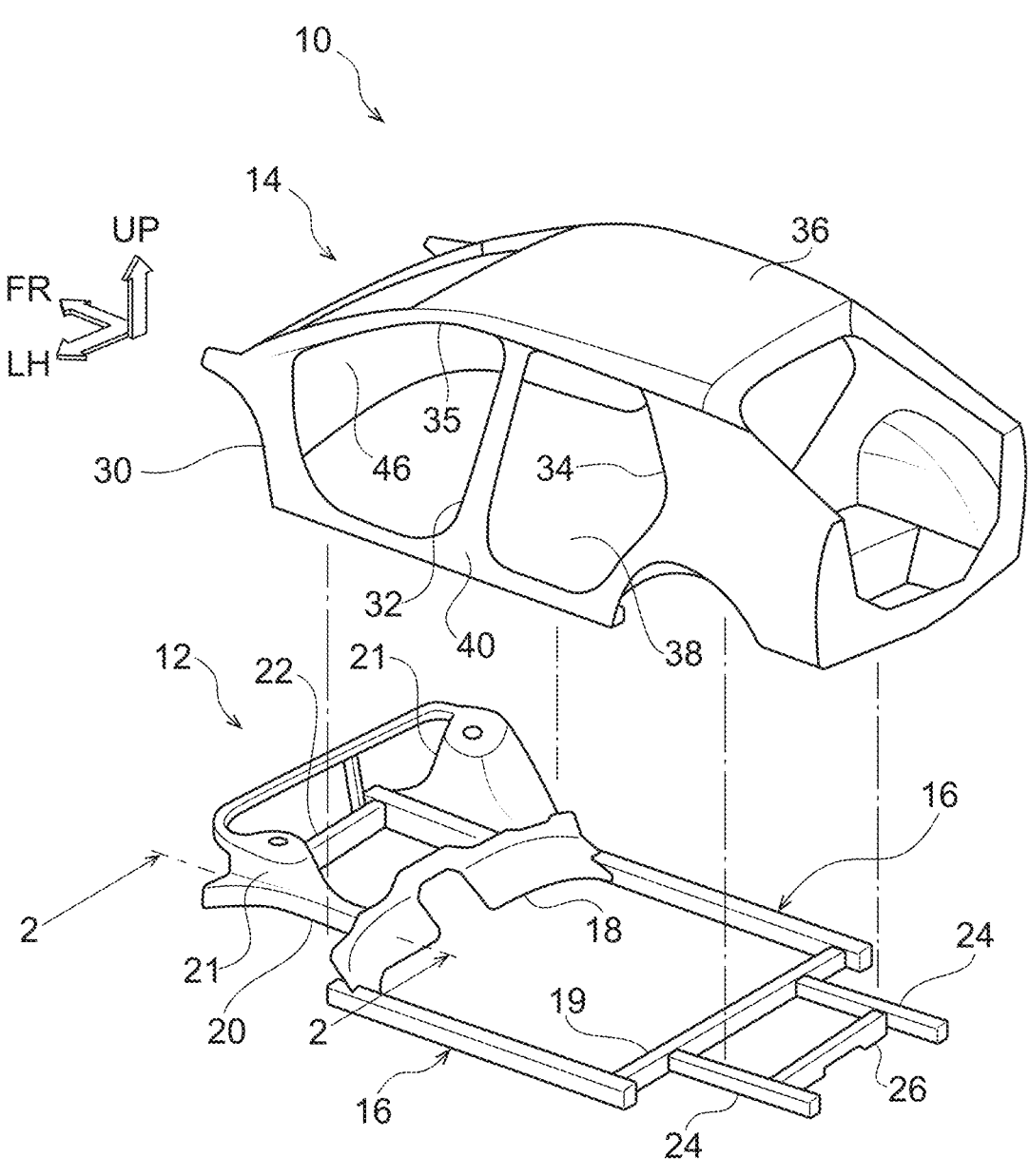
FIG. 1 is an exploded perspective view showing main parts of a vehicle to which a vehicle lower body structure pertaining to a first embodiment has been applied.

A vehicle lower body structure pertaining to a first embodiment will now be described with reference to the drawings. It will be noted that arrow UP, arrow FR, and arrow LH appropriately shown in the drawings indicate an upward direction in a vehicle vertical direction, a forward direction in a vehicle front-rear direction, and a vehicle leftward direction in a vehicle width direction (facing the direction of travel), respectively, of a vehicle 10 to which the vehicle lower body structure has been applied. When description is given below simply using the directions of front/rear, upper/lower, and left/right, unless otherwise specified these directions will be understood to indicate front/rear in the vehicle front-rear direction, upper/lower in the vehicle vertical direction, and left/right in the vehicle width direction.

FIG. 1 is an exploded perspective view showing main parts of a vehicle 10 to which the vehicle lower body structure pertaining to the first embodiment has been applied. As shown in FIG. 1, the vehicle 10 to which the vehicle lower body structure has been applied is configured to mainly include a lower frame 12 and a body shell 14. The lower frame 12 configures a lower frame of the vehicle 10 and includes rockers 16 that extend in the front-rear direction.

The rockers 16 are provided on outer sides, in the vehicle width direction, of a vehicle lower body and extend in the front-rear direction, and a pair of the rockers 16 are provided on respective sides, in the vehicle width direction. Furthermore, the rockers 16 are each formed in a closed cross-section by extrusion molding or the like.

Front end portions of the pair of rockers 16 are interconnected in the vehicle width direction by a cross member 18. The cross member 18 extends in the vehicle width direction, and rear end portions of front side members 20 are connected to the cross member 18 in positions offset inward, in the vehicle width direction, from respective ends, in the vehicle width direction, of the cross member 18. The cross member 18 interconnects the front end portions of the left and right pair of rockers 16 and interconnects the rear end portions of the left and right pair of front side members 20.

The front side members 20 are provided as a pair on respective sides, in the vehicle width direction, and extend in the front-rear direction. Furthermore, the front side members 20 are each formed in a closed cross-section by extrusion molding or the like, but they may also be configured to have a closed cross-sectional structure by overlapping steel plates on each other. Front end portions of the pair of front side members 20 are interconnected in the vehicle width direction by a front cross member 22. Furthermore, each of the two front side members 20 is provided with a suspension tower 21.

Rear end portions of the pair of rockers 16 are interconnected in the vehicle width direction by a cross member 19, and connected to the cross member 19 are front end portions of rear side members 24. The rear side members 24 are provided as a pair in the vehicle width direction and extend in the front-rear direction. Furthermore, the rear side members 24 are each formed in a closed cross-section by extrusion molding or the like, but they may also be configured to have a closed cross-sectional structure by overlapping steel plates on each other. Rear portions of the pair of rear side members 24 are interconnected in the vehicle width direction by a rear cross member 26.

The body shell 14 configures a cabin of the vehicle 10 and is configured to mainly include front pillars 30, center pillars 32, rear pillar s 34, roof side rails 35, a roof panel 36, a floor panel 38, and outer panels 40.

The front pillars 30 extend in the vertical direction at a front end portion of the body shell 14. The center pillars 32 extend in the vertical direction on a rear side of the front pillars 30. The rear pillars 34 extend in the vertical direction on a rear side of the center pillars 32. Furthermore, the front pillars 30, the center pillars 32, and the rear pillars 34 are provided on respective sides, in the vehicle width direction, and are configured to have closed cross-sectional structures to function as frames of the body shell 14.

The roof side rails 35 interconnect upper ends of the front pillars 30, the center pillars 32, and the rear pillars 34 in the front-rear direction and are provided on respective sides, in the vehicle width direction. The roof panel 36 bridges the left and right roof side rails 35, extends in the vehicle width direction and in the front-rear direction, and configures a ceiling of the vehicle cabin.

The floor panel 38 is provided at a lower portion of the body shell 14, extends in the vehicle width direction and in the front-rear direction, and configures a floor of the vehicle cabin. It will be noted that the floor panel 38 is configured to include a center floor panel connected to the rockers 16 and a rear floor panel connected to the rear side members 24. Furthermore, a front end portion of the floor panel 38 is connected to a dash panel 46 that configures a front wall of the vehicle cabin.

The outer panels 40 configure outer panels of the body shell 14. Specifically, the outer panels 40 are provided at outer surfaces of the frames of the front pillars 30, outer surfaces of the frames of the center pillars 32, and outer surfaces of the frames of the rear pillars 34. Furthermore, lower portions of the outer panels 40 interconnect lower end portions of the front pillars 30, the center pillars 32, and the rear pillars 34 in the front-rear direction and serve as portions fastened to the rockers 16.

Front side openings are formed by the front pillars 30, the center pillars 32, the roof side rails 35, and the outer panels 40, and these front side openings are closed off by front side doors not shown in the drawings. Furthermore, rear side openings are formed by the center pillars 32, the rear pillars 34, the roof side rails 35, and the outer panels 40, and these rear side openings are closed off by rear side doors not shown in the drawings.

(Cross Member 18)

Figure 2:
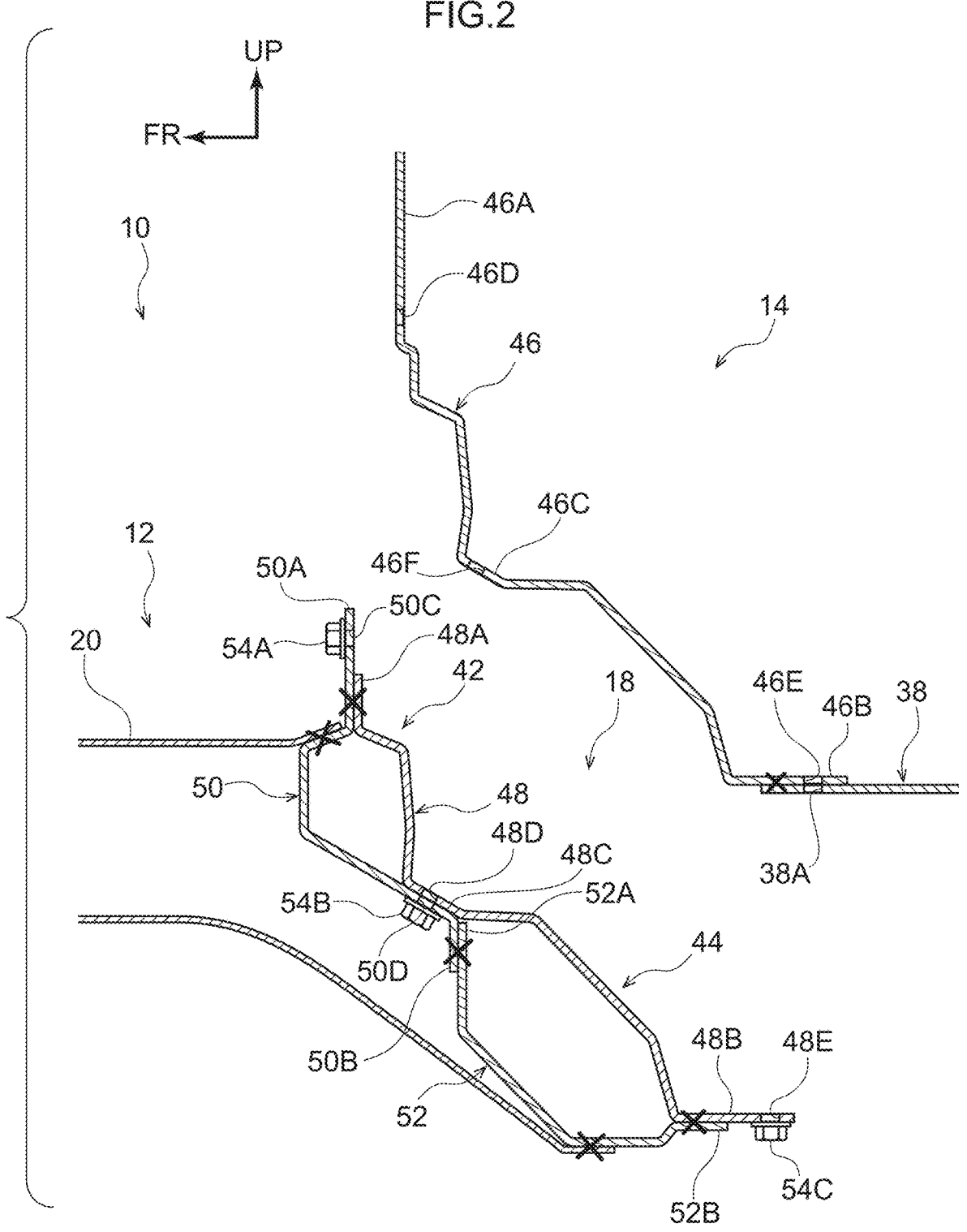
FIG. 2 is an enlarged exploded sectional view, cut along line 2-2 of FIG. 1, showing main parts of the vehicle to which the vehicle lower body structure pertaining to the first embodiment has been applied.

FIG. 2 is an enlarged exploded sectional view, cut along line 2-2 of FIG. 1, showing main parts of the vehicle 10 to which the vehicle lower body structure pertaining to the first embodiment has been applied. As shown in FIG. 2, the cross member 18 is configured in a closed cross-section including a dash upper cross member 42 and a dash lower cross member 44.

The dash upper cross member 42 configures an upper portion of the cross member 18 and is configured in a closed cross-sectional structure by a first outer panel 50 and an inner panel 48. Furthermore, the dash lower cross member 44 is provided at a lower side of the dash upper cross member 42 and is configured in a closed cross-sectional structure by a second outer panel 52 and the inner panel 48.

The first outer panel 50 is formed substantially in the shape of a hat in cross-section that is open in the vehicle rearward direction as viewed from the vehicle width direction, and an upper end of the first outer panel 50 is configured as a first upper flange 50A that extends in the vertical direction. Furthermore, at the first upper flange 50A is formed an insertion hole 50C through which a bolt is inserted, and a weld nut 54A is attached to the first upper flange 50A in a position corresponding to the insertion hole 50C.

At a lower end of the first outer panel 50 is formed a first lower flange 50B that extends in the vertical direction. Furthermore, upper portions of the front side members 20 are joined by spot welding or the like to the first outer panel 50 in a state in which the front side members 20 and the first outer panel 50 overlap with each other.

At the first lower flange 50B of the first outer panel 50 is formed an insertion hole 50D through which a bolt is inserted, and a weld nut 54B is attached to the first outer panel 50 in a position corresponding to the insertion hole 50D.

The second outer panel 52 is disposed on a lower side of the first outer panel 50 and is formed substantially in the shape of a hat in cross-section that is open in the vehicle rearward direction as viewed from the vehicle width direction. Furthermore, an upper end of the second outer panel 52 is configured as a second upper flange 52A that extends in the vertical direction. The second upper flange 52A overlaps with, and is joined by spot welding or the like to, a rear surface of the first lower flange 50B.

A lower end of the second outer panel 52 is configured as a second lower flange 52B that extends in the front-rear direction, and the second lower flange 52B is joined to the inner panel 48 described later. Furthermore, at a front side of the second lower flange 52B, lower portions of the front side members 20 are joined by spot welding or the like to the second outer panel 52 in a state in which the front side members 20 and the second outer panel 52 overlap with each other.

The inner panel 48 is disposed opposing the first outer panel 50 and the second outer panel 52 in the front-rear direction and has, at its upper portion and lower portion, portions that project in the rearward direction. A projecting portion at the upper portion of the inner panel 48 configures a closed cross-section with the first outer panel 50. Furthermore, a projecting portion at the lower portion of the inner panel 48 configures a closed cross-section with the second outer panel 52.

An upper end of the inner panel 48 is configured as an inner upper flange 48A that extends in the vertical direction, and the inner upper flange 48A is joined by spot welding or the like to the first upper flange 50A of the first outer panel 50 in a state in which the inner upper flange 48A overlaps with the first upper flange 50A. Furthermore, the inner upper flange 48A is formed shorter in length than the first upper flange 50A, so the insertion hole 50C at the first upper flange 50A is not covered by the inner upper flange 48A.

A lower end of the inner panel 48 is configured as an inner lower flange 48B that extends in the front-rear direction, and the inner lower flange 48B is joined by spot welding or the like to the second lower flange 52B of the second outer panel 52 in a state in which the inner lower flange 48B overlaps with the second lower flange 52B. Furthermore, the inner lower flange 48B extends in the rearward direction beyond the second lower flange 52B, and at the inner lower flange 48B is formed an insertion hole 48E through which a bolt is inserted. Furthermore, a weld nut 54C is attached to the inner lower flange 48B at a position corresponding to the insertion hole 48E.

At an intermediate portion in the vertical direction of the inner panel 48 is formed an interconnecting portion 48C that interconnects the projecting portion of the upper portion and the projecting portion of the lower portion of the inner panel 48. The interconnecting portion 48C overlaps with the first outer panel 50, and at the interconnecting portion 48C is formed an insertion hole 48D through which a bolt is inserted. The insertion hole 48D formed at the interconnecting portion 48C communicates with the insertion hole 50D formed at the first outer panel 50. It will be noted that the weld nuts 54A, 54B, 54C configure fasteners of the present disclosure.

(Dash Panel 46)

The dash panel 46 of the body shell 14 is disposed on the vehicle rear side of the cross member 18 in a state in which the dash panel 46 has been assembled to the lower frame 12. Furthermore, the dash panel 46 partitions the vehicle cabin interior from the vehicle cabin exterior.

The dash panel 46 is formed in a shape corresponding to that of the cross member 18 as viewed from the vehicle width direction. Specifically, an upper portion of the dash panel 46 is formed in a shape corresponding to that of the dash upper cross member 42, and a lower portion of the dash panel 46 is formed in a shape corresponding to that of the dash lower cross member 44.

An upper end portion of the dash panel 46 is configured as a dash upper flange 46A that extends in the vertical direction, and at a base end portion of the dash upper flange 46A is formed an insertion hole 46D through which a bolt is inserted.

A lower end portion of the dash panel 46 is configured as a dash lower flange 46B that extends in the front-rear direction, and a front end portion of the floor panel 38 is joined by spot welding or the like to a lower surface of the dash lower flange 46B in a state in which the front end portion of the floor panel 38 overlaps with the dash lower flange 46B. Furthermore, at a rear side of the weld portion at the dash lower flange 46B is formed an insertion hole 46E through which a bolt is inserted. Moreover, at the floor panel 38 is formed an insertion hole 38A, and the insertion hole 38A communicates with the insertion hole 46E.

Moreover, an intermediate portion in the up and down direction of the dash panel 46 is configured as an intermediate fastening portion 46C formed in a shape corresponding to that of the interconnecting portion 48C of the inner panel 48. At the intermediate fastening portion 46C is formed an insertion hole 46F through which a bolt is inserted.

Figure 3:
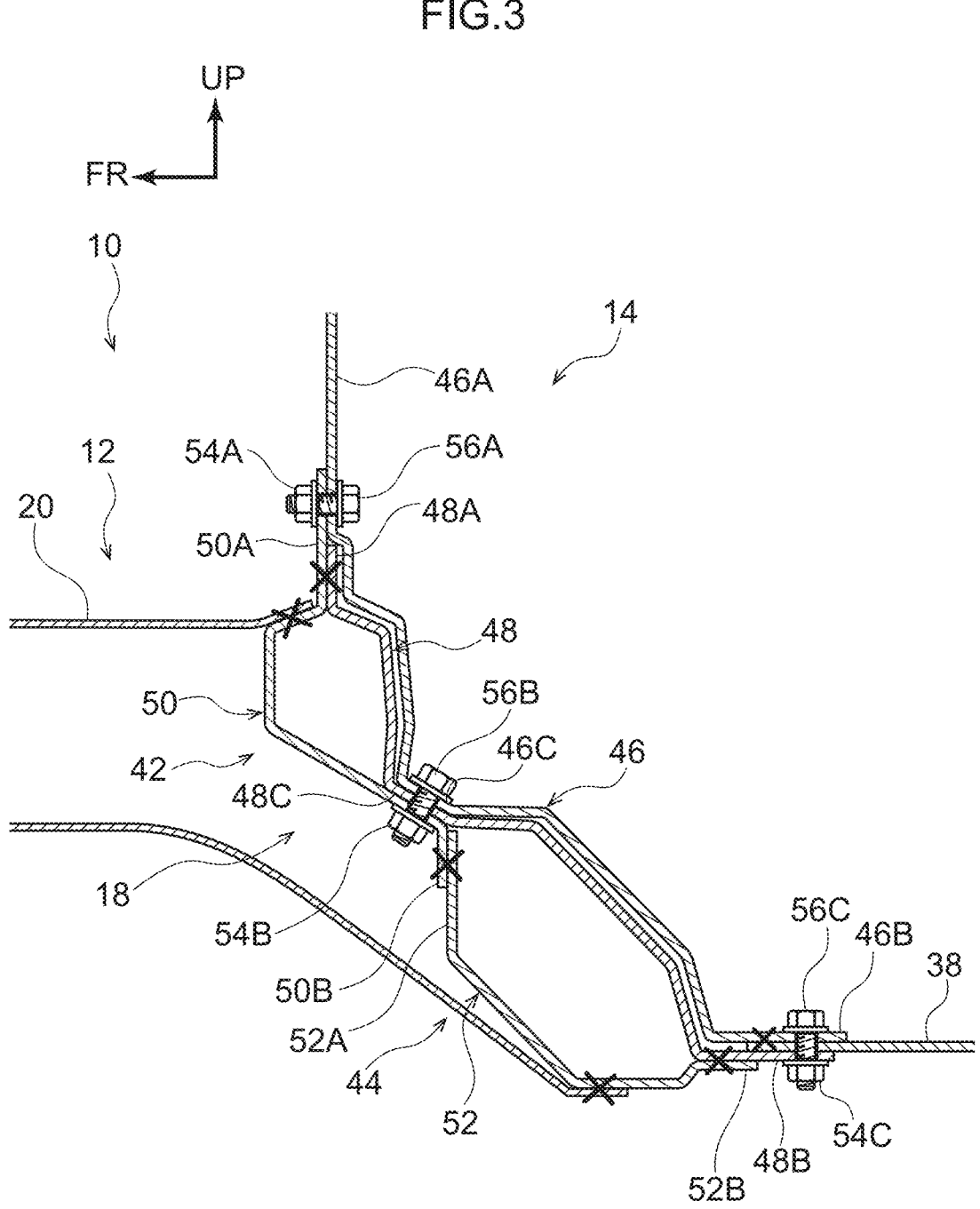
FIG. 3 is an enlarged sectional view showing a state in which the parts shown exploded in FIG. 2 have been assembled.

FIG. 3 is an enlarged sectional view showing a state in which the parts shown exploded in FIG. 2 have been assembled. As shown in FIG. 3, in a state in which the body shell 14 has been assembled to the lower frame 12, the dash panel 46 is mechanically fastened to the cross member 18 via bolts 56A, 56B, 56C configuring fasteners.

Specifically, the dash upper flange 46A on the upper end of the dash panel 46 overlaps with the first upper flange 50A of the first outer panel 50 in the vehicle front-rear direction. Furthermore, in a state in which the insertion hole 46D of the dash panel 46 and the insertion hole 50C of the first outer panel 50 are in communication with each other, the bolt 56A is inserted through the insertion hole 46D and the insertion hole 50C and screwed into the weld nut 54A, whereby the dash panel 46 and the upper portion of the dash upper cross member 42 are mechanically fastened to each other (see FIG. 2).

The dash lower flange 46B at the lower end of the dash panel 46 overlaps with the inner lower flange 48B of the inner panel 48 in the vertical direction via the floor panel 38. Furthermore, in a state in which the insertion hole 46E of the dash panel 46, the insertion hole 38A of the floor panel 38, and the insertion hole 48E of the inner panel 48 are in communication with each other, the bolt 56C is inserted through the insertion hole 46E, the insertion hole 38A, and the insertion hole 48E and screwed into the weld nut 54C, whereby the dash panel 46 and the lower portion of the dash lower cross member 44 are mechanically fastened to each other.

Furthermore, the intermediate fastening portion 46C of the dash panel 46 overlaps with the inner panel 48 and the first outer panel 50. Furthermore, in a state in which the insertion hole 46F of the dash panel 46, the insertion hole 48D of the inner panel 48, and the insertion hole 50D of the first outer panel 50 are in communication with each other, the bolt 56B is inserted through the insertion hole 46F, the insertion hole 48D, and the insertion hole 50D and screwed into the weld nut 54B, whereby the dash panel 46 is mechanically fastened to the cross member 18 between the dash upper cross member 42 and the dash lower cross member 44.

(Action)

Next, the action of the present embodiment will be described.

According to the vehicle lower body structure pertaining to the present embodiment, as shown in FIG. 1, the cross member 18 that extends in the vehicle width direction interconnects the front end portions of the rockers 16 and interconnects the rear end portions of the front side members 20. Furthermore, as shown in FIG. 3, the dash panel 46 is disposed on the vehicle rear side of the cross member 18, and the dash panel 46 partitions the vehicle cabin interior from the vehicle cabin exterior. Moreover, the dash panel 46 is mechanically fastened to the cross member 18 via the bolts 56A, 56B, 56C and the weld nuts 54A, 54B, 54C that are fasteners. Because of this, the dash panel 46 can be easily separated from the cross member 18 by just unfastening these fasteners. Furthermore, it is not necessary to provide dedicated parts or the like between the cross member 18 and the dash panel 46, so an increase in weight can be inhibited.

Furthermore, in the present embodiment, the cross member 18 is configured to have a closed cross-sectional structure, so when the dash panel 46 has been separated from the cross member 18, the frame with the closed cross-sectional structure can be re-used.

Moreover, in the present embodiment, the rigidity of the vehicle 10 can be ensured by the dash upper cross member 42 and the dash lower cross member 44 that are each configured to have a closed cross-sectional structure. Furthermore, by setting a fastening location of the dash panel 46 between the dash upper cross member 42 and the dash lower cross member 44, vibrations and the like input to the fastening location can be absorbed by the dash upper cross member 42 and the dash lower cross member 44, and the fastened state between the dash panel 46 and the cross member 18 can be well maintained.

Moreover, in the present embodiment, the floor panel 38 and the dash panel 46 are joined to each other by welding, so the floor panel 38 and the dash panel 46 can be integrally separated from the cross member 18 by unfastening the fasteners. These effects will be described by way of comparisons with structures of comparative example 1 and comparative example 2.

Comparative Example 1

Figure 8:
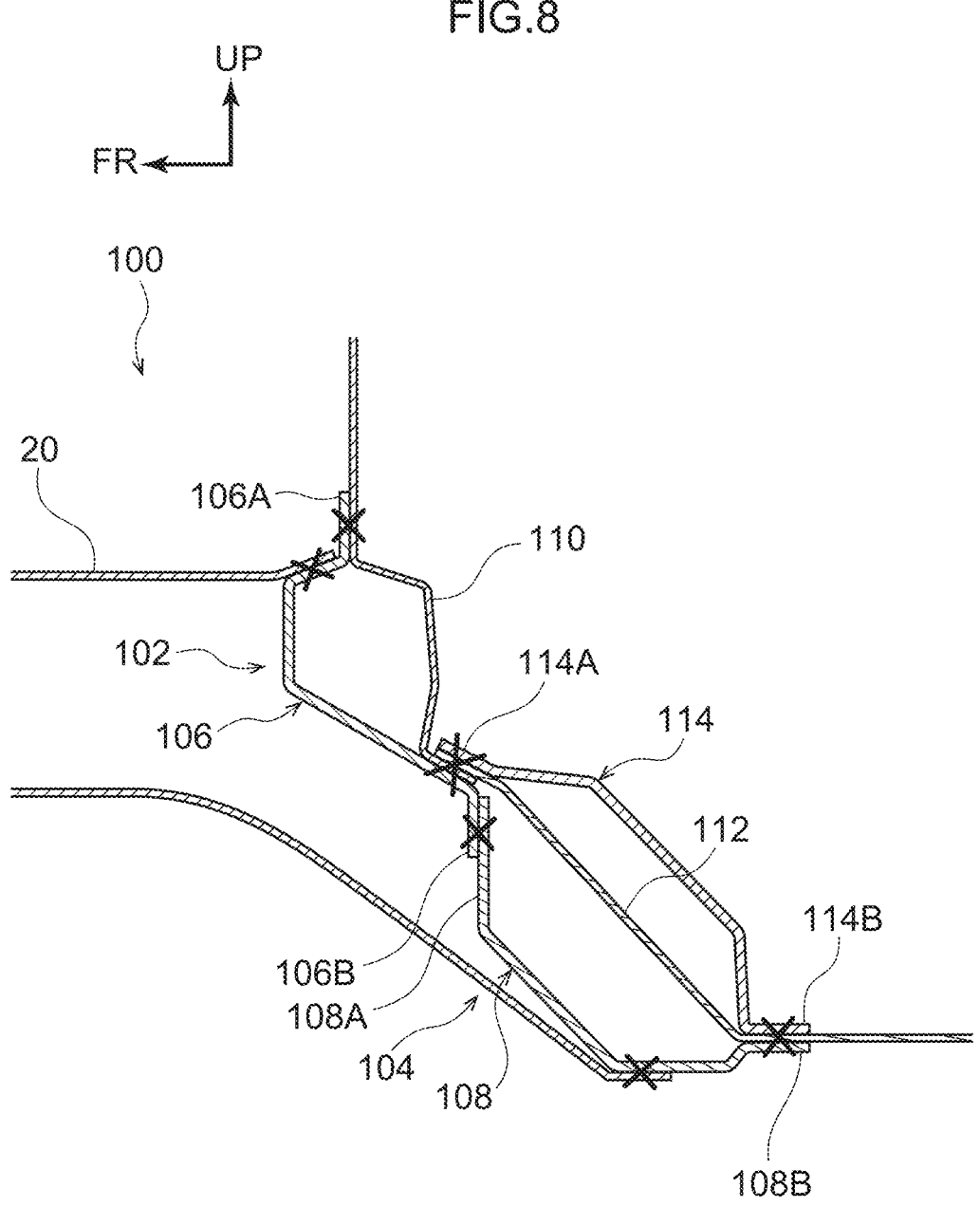
FIG. 8 is an enlarged sectional view showing main parts of a vehicle lower body structure pertaining to comparative example 1.

FIG. 8 is an enlarged sectional view showing main parts of a vehicle lower body structure pertaining to comparative example 1. As shown in FIG. 8, a vehicle 100 pertaining to comparative example 1 is configured to include a dash upper cross member 102 and a dash lower cross member 104. The dash upper cross member 102 is configured in a closed cross-section by a first outer panel 106 and a dash panel 110.

The dash lower cross member 104 is configured in a closed cross-section by a second outer panel 108, a floor panel 112, and an inner panel 114.

Specifically, an upper end of the first outer panel 106 is configured as a first upper flange 106A that extends in the vertical direction, and the first upper flange 106A is joined by spot welding or the like to the dash panel 110 in a state in which the first upper flange 106A overlaps with the dash panel 110 in the front-rear direction. Furthermore, a lower end of the first outer panel 106 is configured as a first lower flange 106B that extends in the vertical direction, and the first lower flange 106B is joined by spot welding or the like to the second outer panel 108 in a state in which the first lower flange 106B overlaps with the second outer panel 108.

An upper end of the second outer panel 108 is configured as a second upper flange 108A that extends in the vertical direction and overlaps with the first lower flange 106B, and the second upper flange 108A is joined to the first lower flange 106B. Furthermore, a lower end of the second outer panel 108 is configured as a second lower flange 108B that extends in the front-rear direction, and the second lower flange 108B is joined to both the floor panel 112 and the inner panel 114 described later.

The dash panel 110 is disposed opposing the first outer panel 106 in the front-rear direction, and a lower end of the dash panel 110 is joined by welding or the like to the floor panel 112 at a position of a lower end of the first outer panel 106.

The floor panel 112 is disposed opposing the second outer panel 108 in the front-rear direction, and an upper end of the floor panel 112 is joined to the first outer panel 106 and the inner panel 114 so as to form three layers. Furthermore, the floor panel 112 is joined to the second outer panel 108 and the inner panel 114 at a position of the second lower flange 108B so as to form three layers.

The inner panel 114 is disposed opposing the floor panel 112 in the front-rear direction, and an upper end of the inner panel 114 is configured as an inner upper flange 114A that is joined to the first outer panel 106 and the floor panel 112. Furthermore, a lower end of the inner panel 114 is config- ured as an inner lower flange 114B that is joined to the second outer panel 108 and the floor panel 112.

In comparative example 1 configured as described above, a cross member is configured by the dash upper cross member 102 and the dash lower cross member 104. The first outer panel 106, the second outer panel 108, the dash panel 110, the floor panel 112, and the inner panel 114, which configures the dash upper cross member 102 and the dash lower cross member 104, are joined to each other by welding. The dash panel 110 and the floor panel 112 cannot be easily separated from a frame of the vehicle 100. In particular, because the upper end of the floor panel 112 is joined to the first outer panel 106 and the inner panel 114 so as to form three layers, the floor panel 112, the first outer panel 106, and the inner panel 114 cannot be separated leaving a shape of the frame.

In contrast, in the present embodiment, as shown in FIG. 3, the dash panel 46 and the floor panel 38 are mechanically fastened to the cross member 18 in a state in which the dash panel 46 and the floor panel 38 are joined to each other. Because of this, the dash panel 46 and the floor panel 38 can be easily separated from the lower frame 12 by just unfastening the bolts 56A, 56B, 56C.

Comparative Example 2

Figure 9:
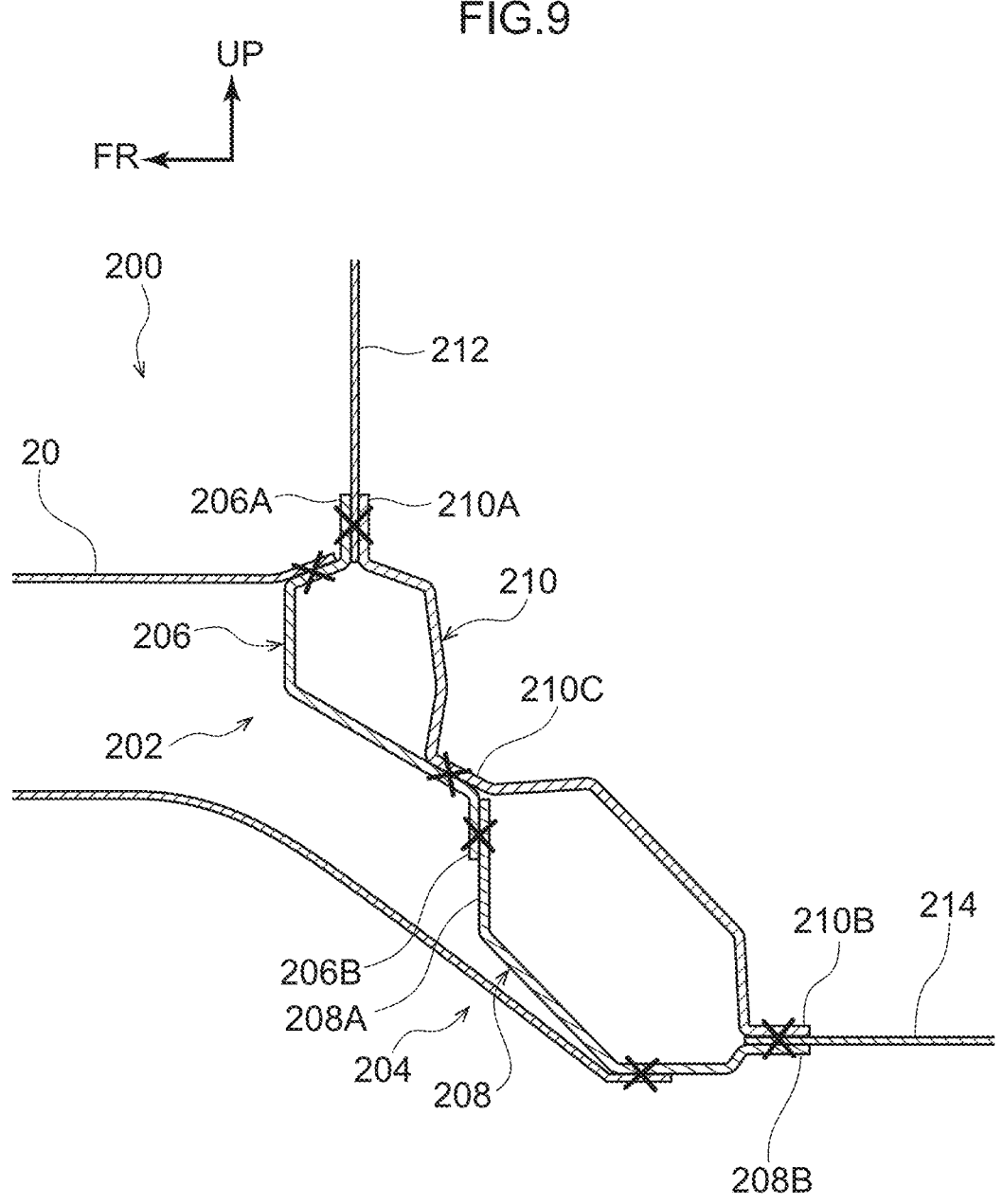
FIG. 9 is an enlarged sectional view showing main parts of a vehicle lower body structure pertaining to comparative example 2.

FIG. 9 is an enlarged sectional view showing main parts of a vehicle lower body structure pertaining to comparative example 2. As shown in FIG. 9, a vehicle 200 pertaining to comparative example 2 is configured to include a dash upper cross member 202 and a dash lower cross member 204. The dash upper cross member 202 forms a closed cross-section with a first outer panel 206 and an inner panel 210. Furthermore, the dash lower cross member 204 forms a closed cross-section with a second outer panel 208 and the inner panel 210.

Specifically, an upper end of the first outer panel 206 is configured as a first upper flange 206A that extends in the vertical direction, and the first upper flange 206A is joined by spot welding or the like to the inner panel 210 with a dash panel 212 sandwiched therebetween in a state in which the first upper flange 206A overlaps with the inner panel 210 in the front-rear direction.

Furthermore, a lower end of the first outer panel 206 is configured as a first lower flange 206B that extends in the vertical direction, and the first lower flange 206B is joined by spot welding or the like to the second outer panel 208 in a state in which the first lower flange 206B overlaps with the second outer panel 208.

An upper end of the second outer panel 208 is configured as a second upper flange 208A that extends in the vertical direction and overlaps with the first lower flange 206B, and the second upper flange 208A is joined to the first lower flange 206B. Furthermore, a lower end of the second outer panel 208 is configured as a second lower flange 208B that extends in the front-rear direction, and the second lower flange 208B is joined to both a floor panel 214 and the inner panel 210.

The inner panel 210 is disposed opposing the first outer panel 206 and the second outer panel 208 in the front-rear direction, and an upper end of the inner panel 210 is configured as an inner upper flange 210A that is welded to both the first upper flange 206A of the first outer panel 206 and the dash panel 212.

A lower end of the inner panel 210 is configured as an inner lower flange 210B that is welded to both the second lower flange 208B of the second outer panel 208 and the floor panel 214.

Furthermore, an intermediate portion in the vertical direction of the inner panel 210 is configured as an interconnecting portion 210C that interconnects the dash upper cross member 202 and the dash lower cross member 204, and the interconnecting portion 210C is joined by spot welding or the like to the first outer panel 206 in a state in which the interconnecting portion 210C overlaps with the first outer panel 206.

In comparative example 2 configured as described above, a cross member is configured by the dash upper cross member 202 and the dash lower cross member 204. The first outer panel 206, the second outer panel 208, and the inner panel 110, which configure the dash upper cross member 202 and the dash lower cross member 204, are joined to each other by welding. The dash panel 212 and the floor panel 214 cannot be easily separated from a frame of the vehicle 200. In particular, because the lower end of the dash panel 212 is joined to the first outer panel 206 and the inner panel 210 so as to form three layers, they cannot be separated leaving a shape of the frame. In the same way, because the floor panel 214 is joined to the second outer panel 208 and the inner panel 210 so as to form three layers, they cannot be separated leaving a shape of the frame.

In contrast, in the present embodiment, as shown in FIG. 3, the dash panel 46 and the floor panel 38 are mechanically fastened to the cross member 18 in a state in which the dash panel 46 and the floor panel 38 are joined to each other. Because of this, the dash panel 46 and the floor panel 38 can be easily separated from the lower frame 12 by just unfastening the bolts 56A, 56B, 56C.

Second Embodiment

Next, a vehicle lower body structure pertaining to a second embodiment will be described with reference to FIG. 4 and FIG. 5. It will be noted that configurations that are the same as those of the first embodiment are assigned the same reference signs and description will be omitted as appropriate.

Figure 4:
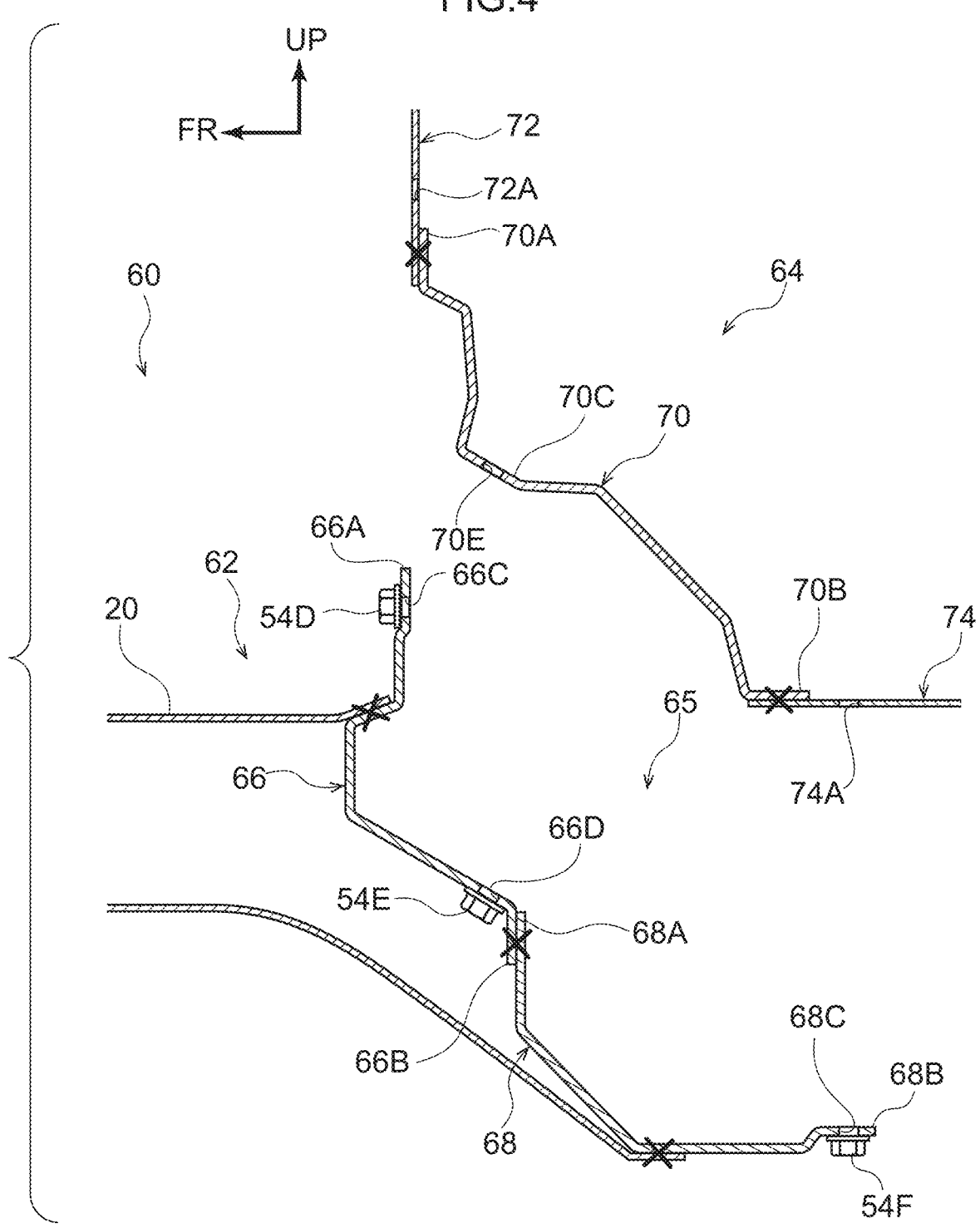
FIG. 4 is an enlarged exploded sectional view showing main parts of a vehicle to which a vehicle lower body structure pertaining to a second embodiment has been applied.

FIG. 4 is an enlarged exploded sectional view showing main parts of a vehicle 60 to which the vehicle lower body structure pertaining to the second embodiment has been applied. As shown in FIG. 4, the vehicle lower body structure pertaining to the present embodiment includes a lower frame 62, and on the lower frame 62 is mounted a body shell 64.

A cross member 65 configuring the lower frame 62 is configured to include a dash upper cross member 66 and a dash lower cross member 68. Furthermore, the cross member 65 of the present embodiment includes open cross-sectional portions that are open in the rearward direction as viewed from the vehicle width direction.

The dash upper cross member 66 configures an upper portion of the cross member 65 and is formed substantially in the shape of a hat in cross-section that is open in the rearward direction as viewed from the vehicle width direction. Furthermore, an upper end of the dash upper cross member 66 is configured as a first upper flange 66A that extends in the vertical direction. Furthermore, at the first upper flange 66A is formed an insertion hole 66C through which a bolt is inserted, and a weld nut 54D is attached to the first upper flange 66A in a position corresponding to the insertion hole 66C.

At a lower end portion of the dash upper cross member 66 is formed a first lower flange 66B that extends in the vertical direction. Furthermore, portions of the front side members 20 are joined by spot welding or the like to the dash upper cross member 66 in a state in which the front side members 20 and the dash upper cross member 66 overlap with each other.

Above the first lower flange 66B of the dash upper cross member 66 is formed an insertion hole 66D through which a bolt is inserted, and a weld nut 54E is attached to the dash upper cross member 66 in a position corresponding to the insertion hole 66D.

The dash lower cross member 68 is disposed on a lower side of the dash upper cross member 66 and is formed substantially in the shape of a hat in cross-section that is open in the rearward direction as viewed from the vehicle width direction. Furthermore, an upper end of the dash lower cross member 68 is configured as a second upper flange 68A that extends in the vertical direction. The second upper flange 68A overlaps with, and is joined by spot welding or the like to, a rear surface of the first lower flange 66B.

A lower end of the dash lower cross member 68 is configured as a second lower flange 68B that extends in the front-rear direction, and the second lower flange 68B is joined to a floor panel 74 described later. Furthermore, on a front side of the second lower flange 66B, portions of the front side members 20 are joined by spot welding or the like to the dash lower cross member 68 in a state in which the front side members 20 and the dash lower cross member 68 overlap with each other.

A dash panel 70 is disposed opposing the dash upper cross member 66 and the dash lower cross member 68 in the front-rear direction and has open cross-sectional portions that are open in the forward direction as viewed from the vehicle width direction. Specifically, the dash panel 70 includes open cross-sectional portions that project in the rearward direction in its upper portion and its lower portion. The projecting portion in an upper portion of the dash panel 70 configures a closed cross-section with the dash upper cross member 66. Furthermore, the projecting portion in a lower portion of the dash panel 70 configures a closed cross-section with the dash lower cross member 68.

An upper end of the dash panel 70 is configured as an upper flange 70A that extends in the vertical direction, and a lower end of a dash upper panel 72 is joined by spot welding or the like to the upper flange 70A in a state in which the upper flange 70A and the dash upper panel 72 overlaps with each other. Furthermore, at the dash upper panel 72 is formed an insertion hole 72A through which a bolt is inserted.

A lower end of the dash panel 70 is configured as a lower flange 70B that extends in the front-rear direction, and a front end of the floor panel 74 is joined by spot welding or the like to the lower flange 70B. Furthermore, at the floor panel 74 is formed an insertion hole 74A through which a bolt is inserted.

At an intermediate portion in the vertical direction of the dash panel 70 is formed an interconnecting portion 70C that interconnects the projecting portion in the upper portion and the projecting portion in the lower portion of the dash panel 70.

Figure 5:
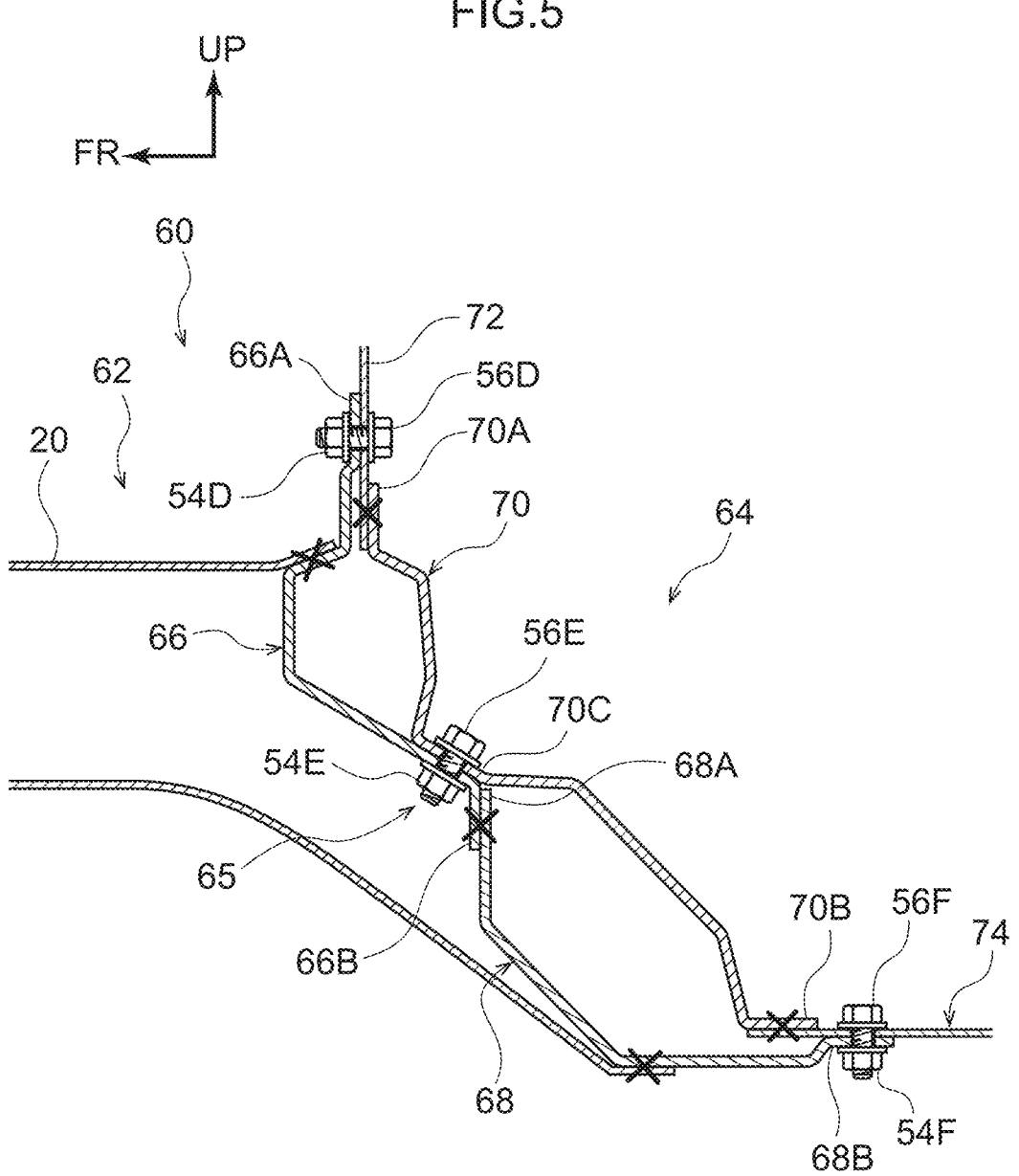
FIG. 5 is an enlarged sectional view showing a state in which the parts shown exploded in FIG. 4 have been assembled.

FIG. 5 is an enlarged sectional view showing a state in which the parts shown exploded in FIG. 4 have been assembled. As shown in FIG. 5, in a state in which the body shell 64 has been assembled to the lower frame 62, the dash upper panel 72 is mechanically fastened to the cross member 65 via a bolt 56D configuring a fastener. Furthermore, the dash panel 70 is mechanically fastened to the cross member 65 via a bolt 56E configuring a fastener, and the floor panel 74 is mechanically fastened to the cross member 65 via a bolt 56F configuring a fastener.

Specifically, the dash upper panel 72 overlaps with the first upper flange 66A of the dash upper cross member 66 in the front-rear direction. Furthermore, in a state in which the insertion hole 72A in the dash upper panel 72 and the insertion hole 66C in the dash upper cross member 66 are in communication with each other, the bolt 56D is passed through the insertion hole 72A and the insertion hole 66C and screwed into the weld nut 54D, whereby the dash upper panel 72 and the upper portion of the dash upper cross member 66 are mechanically fastened to each other (see FIG. 5).

The floor panel 74, which is joined to the lower flange 70B at the lower end of the dash panel 70, overlaps with the second lower flange 68B of the dash lower cross member 68 in the vertical direction. Furthermore, in a state in which the insertion hole 74A at the floor panel 74 and an insertion hole 68C at the dash lower cross member 68 are in communication with each other, the bolt 56F is inserted through the insertion hole 74A and the insertion hole 68C and screwed into a weld nut 54F, whereby the floor panel 74 and the lower portion of the dash lower cross member 68 are mechanically fastened to each other.

Furthermore, the interconnecting portion 70C of the dash panel 70 overlaps with the lower end portion of the dash upper cross member 66. Furthermore, in a state in which an insertion hole 70E at the dash panel 70 and an insertion hole 66D at the dash upper cross member 66 are in communication with each other, the bolt 56E is inserted through the insertion hole 70E and the insertion hole 66D and screwed into the weld nut 54E, whereby the dash panel 70 and the lower portion of the dash upper cross member 66 are mechanically fastened to each other.

As described above, in the present embodiment, a closed cross-section is configured by the dash upper cross member 66 and the dash panel 70, and a closed cross-section is configured by the dash lower cross member 68 and the dash panel 70. Furthermore, the present embodiment is not provided with a member corresponding to the inner panel 48 of the first embodiment.

(Action)

Next, the action of the present embodiment will be described.

According to the vehicle lower body structure pertaining to the present embodiment, the body shell 64 including the dash panel 70, the dash upper panel 72, and the floor panel 74 is mechanically fastened to the cross member 65 via the bolts 56D, 56E, 56F and the weld nuts 54D, 54E, 54F that are fasteners. Because of this, the body shell 64 including the dash panel 70 can be easily separated from the cross member 65 by just unfastening these fasteners.

Furthermore, in the present embodiment, a closed cross-sectional structure is configured by assembling the cross member 65 and the dash panel 70 to each other, so compared with a case where a closed cross-sectional structure is configured on the lower frame 62 side, the number of parts can be reduced while inhibiting interference with the shape of the dash lower cross member 68. Other actions are the same as those of the first embodiment.

Third Embodiment

Next, a vehicle lower body structure pertaining to a third embodiment will be described with reference to FIG. 6. It will be noted that configurations that are the same as those of the first embodiment are assigned the same reference signs and description will be omitted as appropriate.

Figure 6:
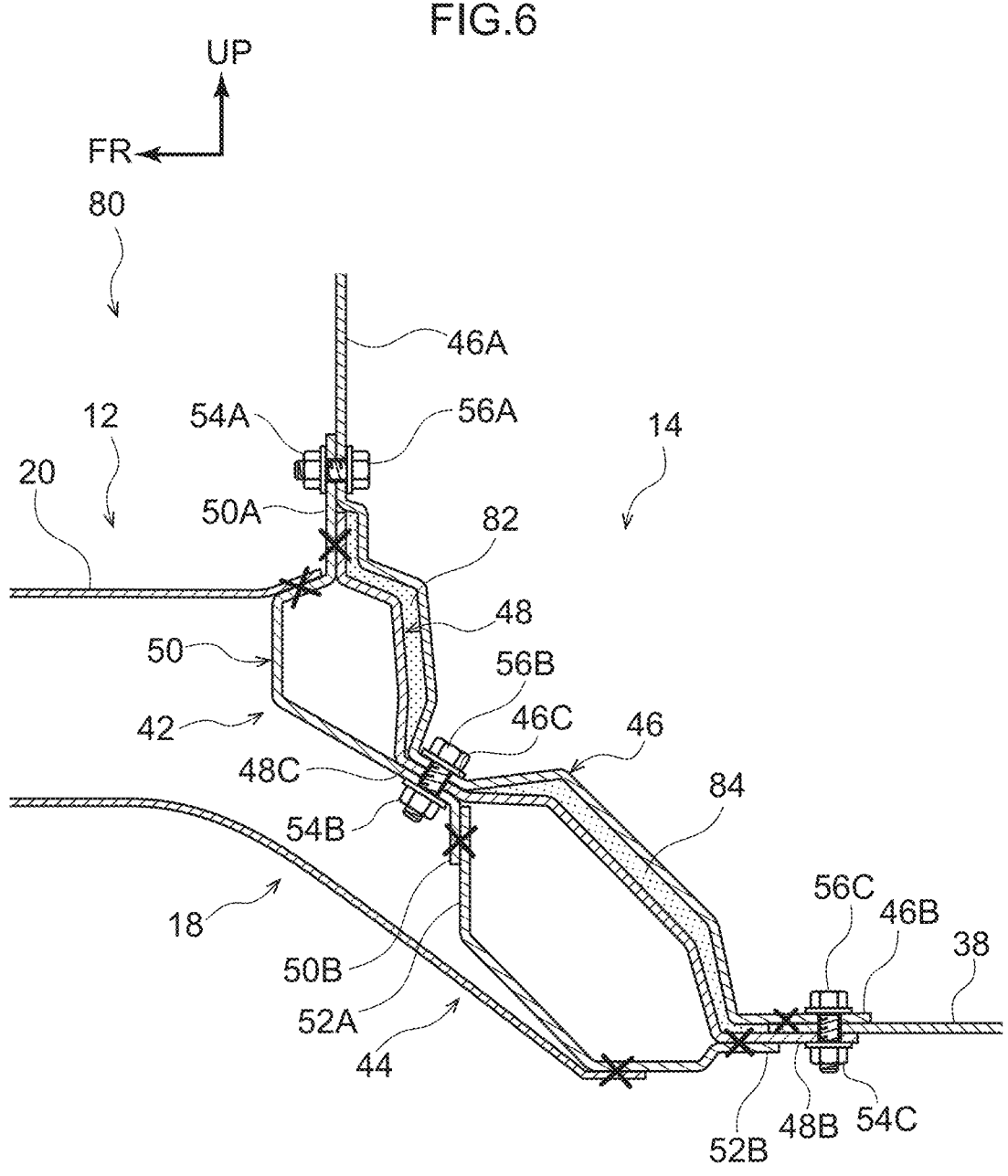
FIG. 6 is an enlarged sectional view showing main parts of a vehicle to which a vehicle lower body structure pertaining to a third embodiment has been applied.

FIG. 6 is an enlarged sectional view showing main parts of a vehicle 80 to which the vehicle lower body structure pertaining to the third embodiment has been applied. As shown in FIG. 6, the present embodiment has the same configurations as those of the first embodiment except that it is provided with sound insulating members 82, 84.

The sound insulating member 82 is provided between the dash upper cross member 42 and the dash panel 46. The sound insulating member 82 may, for example, be a sponge made of urethane or a rubber sheet. Furthermore, a porous sound absorbing material may be employed as the sound insulating member 82.

The sound insulating member 84 is provided between the dash lower cross member 44 and the dash panel 46 and is formed of the same material as that of the sound insulating member 82.

(Action)

Next, the action of the present embodiment will be described.

According to the vehicle lower body structure pertaining to the present embodiment, sound produced by contact between the dash panel 46 and the cross member 18 can be inhibited by the sound insulating members 82, 84. Furthermore, at least some vibration input to the fastening locations can be absorbed by the sound insulating members 82, 84. That is, by inhibiting vibration of the fastened portion where the dash panel 46 and the cross member 18 are fastened to each other by the bolt 56B and the weld nut 54B, the fastened state can be well maintained. Other actions are the same as those of the first embodiment.

Vehicle lower body structures pertaining to embodiments have been described above, but the present disclosure can of course be implemented in various ways without departing from the scope of the present disclosure. In the first embodiment, as shown in FIG. 3, the dash panel 46 is mechanically fastened at the intermediate fastening portion 46C with the inner panel 48 and the first outer panel 50, but the vehicle lower body structure of the first embodiment is not limited to this. For example, as an example modification of the first embodiment, the vehicle lower body structure may have a structure in which the inner panel 48 and the first outer panel 50 are joined to each other by welding.

Example Modifications

Figure 7:
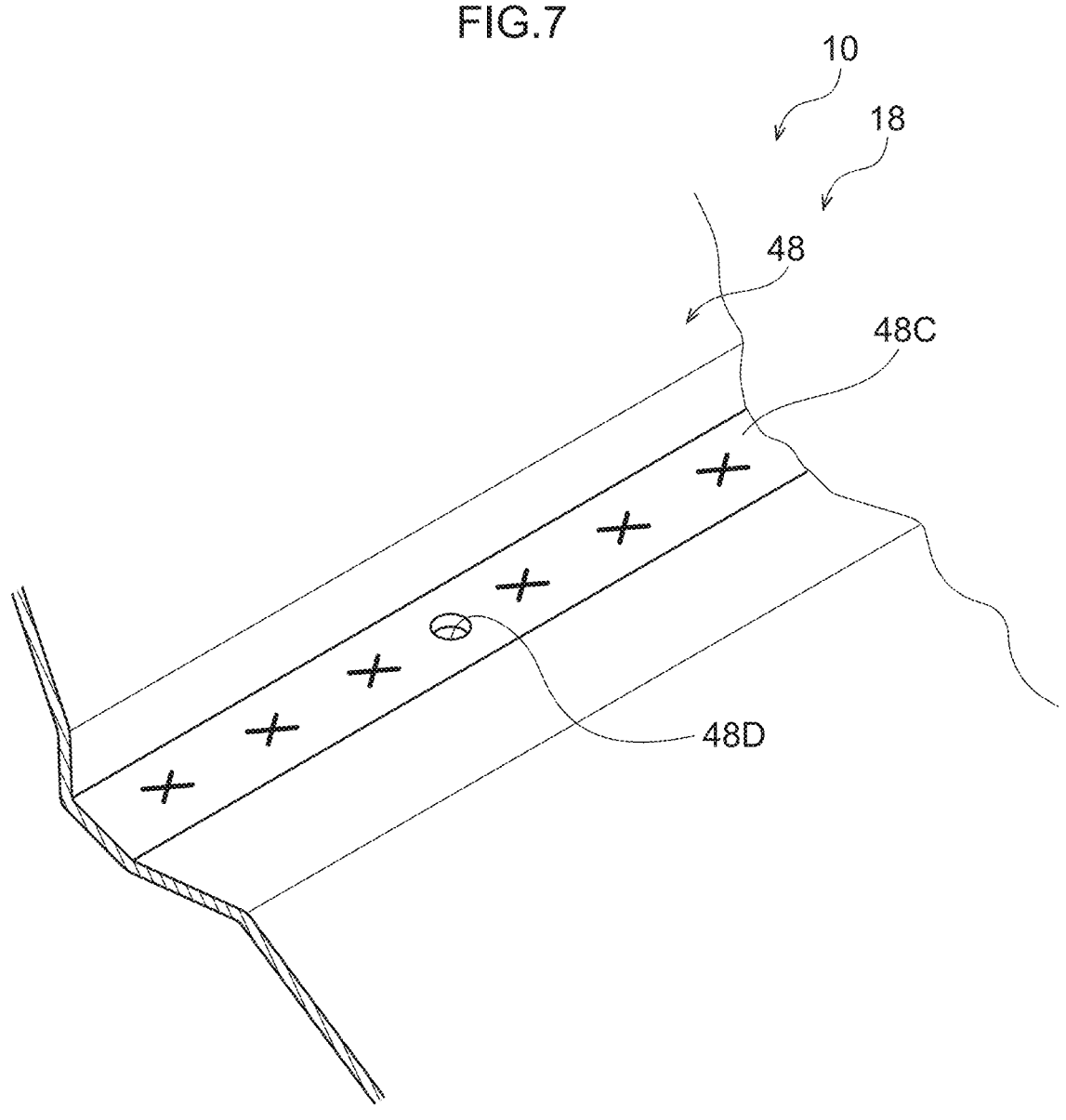
FIG. 7 is a perspective view, as viewed from the vehicle rear side and obliquely from the vehicle upper left side, showing main parts of a vehicle to which a vehicle lower body structure pertaining to an example modification has been applied.

FIG. 7 is a perspective view, as viewed from the vehicle rear side and obliquely from the vehicle upper left side, showing main portions of the vehicle 10 to which a vehicle lower body structure pertaining to an example modification has been applied. As shown in FIG. 7, in the interconnecting portion 48C of the inner panel 48 configuring the cross member 18, the insertion hole 48D is formed through which a bolt is inserted.

Here, the insertion hole 48D is formed at intervals in the vehicle width direction, and areas between adjacent insertion holes 48D are welding locations where the inner panel 48 and the first outer panel 50 are spot-welded to each other.

In the present embodiment, the inner panel 48 and the first outer panel 50 are welded to each other at the interconnecting portion 48C of the inner panel 48, so the strength of the cross member 18 is improved. Furthermore, the insertion holes 48D are formed between the welding locations, so the dash panel 46 can be mechanically fastened to the cross member 18.

Furthermore, in the above embodiments, the front side members 20 are welded to the cross members 18, 65, but they are not limited to this. For example, the cross members 18, 65 and the front side members 20 may be integrally formed. In the same way, in FIG. 1, the rockers 16 and the cross member 18 may be integrally formed.

Moreover, in the above embodiments, bolts and weld nuts are used as the fasteners, but the fasteners are not limited to this, and other fasteners may also be employed. For example, fasteners such as rivets may be used for at least some of the fasteners. Moreover still, in the second embodiment, the cross member 65 is configured to include the dash upper cross member 66 and the dash lower cross member 68, but the cross member 65 is not limited to this, and the cross member may be configured by one dash cross member.

What is claimed is:

1. A vehicle lower body structure, comprising:

a left and right pair of rockers provided on respective sides, in a vehicle width direction, of a vehicle lower body and extending in a vehicle front-rear direction;

a left and right pair of front side members provided at a front side, in a vehicle front-rear direction, of the rockers and extending in the vehicle front-rear direction;

a cross member extending in the vehicle width direction, interconnecting front end portions of the left and right pair of rockers, and interconnecting rear end portions of the left and right pair of front side members; and a dash panel disposed on a rear side, in the vehicle front-rear direction, of the cross member, mechanically fastened to the cross member via fasteners, and partitioning a vehicle cabin interior from a vehicle cabin exterior, wherein:

the cross member includes a dash upper cross member positioned on an upper side and a dash lower cross member positioned on a lower side in a vehicle vertical direction, and the dash panel and the cross member are fastened at a position between the dash upper cross member and the dash lower cross member.

2. The vehicle lower body structure of claim 1, wherein the cross member is configured to have a closed cross-sectional structure as viewed from the vehicle width direction.

3. The vehicle lower body structure of claim 2, wherein: each of the dash upper cross member and the dash lower cross member has a closed cross-sectional structure.

4. The vehicle lower body structure of claim 3, wherein sound insulating members are provided between the cross member and the dash panel.

5. The vehicle lower body structure of claim 1, wherein:
the cross member includes open cross-sectional portions that are open in the vehicle rearward direction as viewed from the vehicle width direction,
the dash panel includes open cross-sectional portions that are open in the vehicle forward direction as viewed from the vehicle width direction, and
closed cross-sections are configured in a state in which the cross member and the dash panel are fastened to each other.

6. The vehicle lower body structure of claim 1, wherein a lower end portion of the dash panel is joined to a floor panel configuring a floor inside the vehicle cabin.

7. The vehicle lower body structure of claim 1, wherein:
the cross member includes an interconnecting portion between the dash upper cross member and the dash lower cross member, and
the dash panel and the cross member are fastened by the fastener at the interconnecting portion.

* * * * *